(12) United States Patent
Riedisser et al.

(10) Patent No.: US 11,661,977 B2
(45) Date of Patent: May 30, 2023

(54) WET-RUNNING MULTI-DISK CLUTCH AND MOTOR VEHICLE TRANSMISSION

(71) Applicant: ZF Friedrichshafen AG, Friedrichshafen (DE)

(72) Inventors: Thomas Riedisser, Sigmarszell (DE); Peter Reinders, Markdorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/459,526

(22) Filed: Aug. 27, 2021

(65) Prior Publication Data

US 2022/0065308 A1    Mar. 3, 2022

(30) Foreign Application Priority Data

Aug. 28, 2020    (DE) .................... 10 2020 210 871.4

(51) Int. Cl.
*F16D 13/52*    (2006.01)
*F16D 25/0638*    (2006.01)
*F16D 25/12*    (2006.01)
*F16D 121/04*    (2012.01)

(52) U.S. Cl.
CPC ....... *F16D 25/0638* (2013.01); *F16D 25/123* (2013.01); *F16D 2121/04* (2013.01)

(58) Field of Classification Search
CPC .... F16D 25/0638; F16D 25/123; F16D 13/52; F16D 13/683; F16D 13/648
See application file for complete search history.

(56) References Cited

U.S. PATENT DOCUMENTS

| 7,225,908 B2 | 6/2007 | Beck et al. |
| 8,821,336 B2 * | 9/2014 | Wilton .................... F16D 13/70 |
| | | 475/159 |
| 10,480,589 B2 | 11/2019 | Carey et al. |

(Continued)

FOREIGN PATENT DOCUMENTS

| DE | 10350935 A1 | 5/2004 |
| DE | 102006023288 A1 | 11/2007 |

(Continued)

OTHER PUBLICATIONS

Definition of "proximate" retrieved from www.merriam-webster.com (Year: 2022).*

(Continued)

*Primary Examiner* — Stacey A Fluhart
(74) *Attorney, Agent, or Firm* — Dority & Manning, P.A.

(57) ABSTRACT

A wet-running multi-disk clutch (B) for a motor vehicle transmission (G) includes a piston (K) provided at a first side of the multi-disk clutch (B), by which a force acting in an axial direction is applicable onto inner and outer clutch disks (IL, AL) in order to engage the multi-disk clutch (B). The multi-disk clutch (B) is supported against an abutting surface (AF) via an end disk (ALE) of the outer clutch disks (AL) at a second side, which is opposite the first side. Grooves (N) are provided at one or both of the abutting surface (AF) and the end disk (ALE). The grooves (N) are configured and arranged such that cooling fluid (O) routed to the multi-disk clutch (B) is flowable out of the multi-disk clutch (B) through the grooves (N).

14 Claims, 10 Drawing Sheets

(56) References Cited

U.S. PATENT DOCUMENTS

| | | | |
|---|---|---|---|
| 2004/0084274 A1* | 5/2004 | Schreiber | F16D 13/52 |
| | | | 192/70.2 |
| 2007/0267265 A1 | 11/2007 | Sudau et al. | |
| 2008/0006501 A1* | 1/2008 | Haupt | F16D 13/72 |
| | | | 192/85.61 |
| 2013/0313063 A1* | 11/2013 | Fujii | F16D 13/648 |
| | | | 192/66.3 |

FOREIGN PATENT DOCUMENTS

| | | | | |
|---|---|---|---|---|
| DE | 102008001358 A1 * | 10/2009 | | F16D 25/0638 |
| DE | 102017203637 A1 | 9/2018 | | |
| DE | 102018115258 A1 | 12/2018 | | |
| EP | 0822350 A2 | 2/1998 | | |
| EP | 1693588 A2 * | 8/2006 | | F16B 21/18 |
| JP | 2002106597 A * | 4/2002 | | |

OTHER PUBLICATIONS

German Search Report DE 10 2020 210 871.4, dated Aug. 3, 2021. (14 pages).

* cited by examiner

WET-RUNNING MULTI-DISK CLUTCH AND MOTOR VEHICLE TRANSMISSION

CROSS-REFERENCE TO RELATED APPLICATION

The present application is related and has right of priority to German Patent Application No. 102020210871.4 filed in the German Patent Office on Aug. 28, 2020, which is incorporated by reference in its entirety for all purposes.

FIELD OF THE INVENTION

The present invention relates generally to a wet-running multi-disk clutch for a motor vehicle transmission, and to a motor vehicle transmission having a multi-disk clutch of this type.

BACKGROUND

EP 0 822 350 A2 describes a wet-running multi-disk clutch. Friction elements are connected to an outer element and to an inner element in alternation. The friction elements are axially displaceable and can be brought into frictional contact with one another by the axial application of force. According to the embodiment of EP 0 822 350 A2 represented in FIG. 6 and FIG. 7, lube oil is routed radially from the outside through a duct to the multi-disk clutch. In the disengaged condition of the multi-disk clutch, the lube oil can flow out through a gap between the last outer clutch disk and a support shim. A wave spring is arranged in the gap, which holds the gap open in the disengaged condition of the multi-disk clutch. If the multi-disk clutch is engaged, the wave spring is compressed and, in this way, closes the gap between the last outer clutch disk and the support shim.

The use of the wave spring is disadvantageous for various reasons. On the one hand, the spring force of the wave spring must be overcome during the actuation of the multi-disk clutch, thereby increasing the amount of force necessary for actuating the multi-disk clutch. On the other hand, the cross-section for the outflow of the lube oil is reduced due to the wave spring. The wave spring therefore operates as a hydraulic restrictor in the lube oil outflow, and so the lube oil can back up and, in so doing, takes the path through the friction elements of the multi-disk clutch. As a result, the drag torque of the multi-disk clutch is correspondingly increased.

SUMMARY OF THE INVENTION

Example aspects of the invention provide a wet-running multi-disk clutch, which is distinguished by an efficient outflow of cooling fluid, and so the multi-disk clutch, in the disengaged condition, has a drag torque that is as low as possible.

In example embodiments, a wet-running multi-disk clutch for a motor vehicle transmission is provided. The multi-disk clutch includes an inner disk carrier and an outer disk carrier. Inner clutch disks are connected to the inner disk carrier via a tooth system. Outer clutch disks are connected to the outer disk carrier via a tooth system. Inner clutch disks and outer clutch disks are arranged in alternation.

The wet-running multi-disk clutch can operate both as a brake and as a clutch. During the utilization as a brake, one of the two disk carriers is arranged in a continuously rotationally fixed manner. During the utilization as a clutch, both disk carriers are rotatably mounted.

A piston is provided at a first side of the multi-disk clutch, by which a force acting in the axial direction is applicable upon the disks. As a result, the inner clutch disks and the outer clutch disks come into frictional contact with one another, and so torque is transmitted between the inner disk carrier and the outer disk carrier. The piston can be actuated in various ways, for example, hydraulically or electromechanically.

The multi-disk clutch is supported via an end disk of the outer clutch disks against an abutting surface, which is located on a side of the multi-disk clutch opposite the first side. The abutting surface can be an integral part of the outer disk carrier. The support against the abutting surface does not need to take place directly via the end disk. Instead, for example, a securing ring can be present between the end disk and the abutting surface.

According to example aspects of the invention, grooves are provided at the abutting surface and/or at the end disk. The grooves are designed and arranged in such a way that cooling fluid routed to the multi-disk clutch can flow out of the multi-disk clutch through the grooves.

According to example aspects of the invention, the abutting surface necessary for counteracting the actuation force is stable enough to act as a duct wall for discharging cooling fluid. The abutting surface can be flat, wherein the grooves are formed in the end disk, for example, by crimpings in the end disk. Alternatively, the end disk can be flat in the area of the contact surface to the abutting surface, wherein the grooves are formed in the abutting surface. A combination of these two approaches is also conceivable.

This type of discharge of cooling fluid out of the multi-disk clutch is advantageous during utilization as a clutch between two rotary parts as well as during utilization as a brake. During the utilization as a clutch, the cooling fluid is forced out of the grooves in the axial direction due to the centrifugal force, and so axially adjacent elements can be supplied with cooling fluid. During the utilization as a brake having a rotationally fixed outer disk carrier, a low-resistance fluid path for discharging the cooling fluid is formed by the grooves, and so the drag torque is reduced in a particularly effective manner.

Preferably, the grooves are arranged in overlap with the tooth system between the end disk and the outer disk carrier, and so the cooling fluid in the area of the tooth system can flow directly into the grooves. In this way, a particularly low-resistance fluid path for discharging the cooling fluid is formed. Therefore, this example embodiment is particularly advantageous for the application of the multi-disk clutch as a brake having a rotationally fixed outer disk carrier.

According to a first possible example embodiment, the grooves are formed in the center in relation to the tooth system. In other words, a center of each tooth between the outer clutch disk and the outer disk carrier corresponds to the center of one groove in each case. An example embodiment of this type is advantageous, in particular, for the case in which the differential speed direction between the inner disk carrier and the outer disk carrier can be different. This is the case because, due to the central arrangement of the grooves, the discharge of cooling fluid out of the multi-disk clutch is independent of the differential speed direction.

According to a second possible example embodiment, the grooves are positioned off-center in relation to the tooth system, preferably in such a way that one edge of the groove is aligned at a flank of the tooth system between the end disk and the outer disk carrier. This example embodiment is based on the finding that the cooling fluid lands at one side of the fluid duct depending on the differential speed direction between the inner disk carrier and the outer disk carrier. If there is a preferred differential speed direction, a particularly low-resistance fluid path for the outflowing cooling fluid is formed due to the off-center arrangement of the grooves.

Preferably, the grooves are aligned in deviation from the radial direction of the multi-disk clutch. In other words, the grooves do not extend exactly radially, but rather are "tilted" in the radial direction. This example embodiment of the multi-disk clutch is particularly advantageous in the case of a preferred differential speed direction. This is the case because the outflowing cooling fluid has a swirl direction depending on the differential speed direction. If the grooves are now "tilted" in this swirl direction, in deviation from the radial direction, a particularly low-resistance fluid path for the outflowing cooling fluid is formed.

Preferably, at least some teeth of the tooth system between the end disk and the outer disk carrier have an indentation in the area of the tooth tip. Due to the indentations, a cooling fluid path to the grooves is formed in an easy way.

Alternatively, a teeth-meshing height of the tooth system between the end disk and the outer disk carrier can be lower than a teeth-meshing height between the remaining outer clutch disks and the outer disk carrier. As a result, a gap is formed between the tooth tips of the end disk-tooth system and the outer disk carrier, and so a cooling fluid can flow to the grooves in an easy way.

Preferably, one of the grooves, in each case, is associated with each tooth of the tooth system between the end disk and the outer disk carrier, in order to configure the cross-section for discharging cooling fluid to be as large as possible.

In an application of the multi-disk clutch as a brake having a rotationally fixed outer disk carrier, it has been shown in tests that it is advantageous to arrange grooves only at a portion of the circumference of the multi-disk clutch. In particular, an arrangement has proven advantageous, in which the grooves are arranged only at one circumferential half of the multi-disk clutch and, in fact, between a spatially lowermost point and a spatially highest point of the multi-disk clutch. Due to an example embodiment of this type, the cooling fluid emerging from the multi-disk clutch through the grooves can flow out, in a better way, from an output side of the grooves, and so the risk of a return flow of cooling fluid through the grooves into the multi-disk clutch is reduced.

The multi-disk clutch is preferably an integral part of a transmission for a motor vehicle, for example, an automatic transmission or an automated transmission. By utilizing the multi-disk clutch in the transmission, the drag torque of the transmission can be reduced. The application of the multi-disk clutch as a brake having a rotationally fixed outer disk carrier is particularly preferred. The outer disk carrier can be formed by the housing of the transmission.

Preferably, a rotary shaft of the transmission is arranged in close axial proximity of the grooves of the multi-disk clutch. Due to the rotation of the shaft, a suction of cooling fluid emerging from the grooves of the multi-disk clutch can be achieved, using the Venturi effect. An approach of this type is particularly advantageous for a multi-disk clutch designed as a brake, since, due to the suction effect, the cooling fluid can be suctioned out of the stationary disk carrier.

In a utilization of the multi-disk clutch in the transmission, in close axial proximity of the grooves to the rotary shaft, it is particularly advantageous to align the grooves in deviation from the radial direction. This is the case because, when the grooves are "tilted" in the direction of the preferred direction of rotation, the Venturi effect can be utilized particularly well to suction out the cooling fluid emerging from the grooves.

BRIEF DESCRIPTION OF THE DRAWINGS

Exemplary embodiments of the invention are described in detail with reference to the figures, wherein.

DETAILED DESCRIPTION

Figure 1:
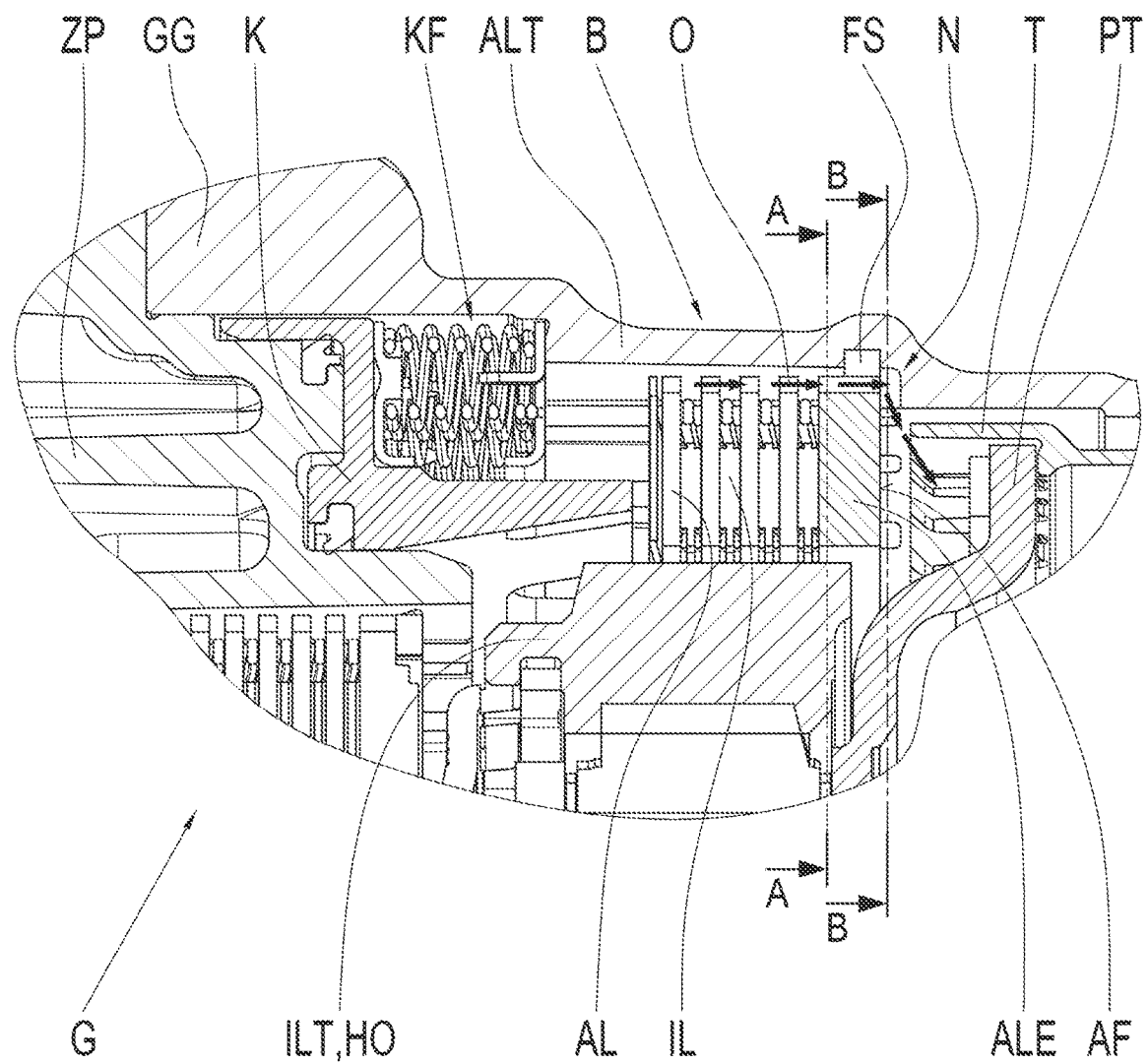
FIG. 1 shows a detailed sectional view of a transmission for a motor vehicle according to a first exemplary embodiment.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a detailed sectional view of a transmission G for a motor vehicle according to a first exemplary embodiment. The transmission G includes a multi-disk clutch B, which operates as a brake. A section of a housing GG of the transmission G operates as an outer disk carrier ALT of the multi-disk clutch B. Outer clutch disks AL, ALE are axially displaceably arranged at the outer disk carrier ALT. A ring gear HO of a planetary gear set of the transmission G forms, at an outer diameter, an inner disk carrier ILT of the multi-disk clutch B. Inner clutch disks IL are axially displaceably arranged at the inner disk carrier ILT. Inner clutch disks IL and outer clutch disks AL, ALE are arranged in alternation. The inner clutch disks IL are designed as lined disks. The outer clutch disks AL, ALE are designed as non-lined disks. A piston K is arranged on one side of the multi-disk clutch B. The piston K can be displaced in the direction of the multi-disk brake B by a hydraulic actuation counter to the force of a spring KF. For this purpose, pressure is applied to a pressure chamber between the piston K and a housing plate ZP connected to the housing GG. As a result, friction surfaces of the inner clutch disks IL and of the outer clutch disks AL, ALE come into frictional contact with each other, and so torque is transmitted between the inner disk carrier ILT and the outer disk carrier ALT. On the side of the multi-disk clutch B facing away from the piston K, the multi-disk clutch B rests against an abutting surface AF of the housing GG via an end disk ALE of the outer clutch disks AL. In order to ensure a flat abutting surface AF for the end disk ALE, a relief groove FS is provided in the housing GG radially outside the end disk ALE.

Cooling fluid O for cooling and lubrication, for example, oil, is routed to the multi-disk brake B. The supply of the cooling fluid O is not represented in greater detail in FIG. 1. In the disengaged, i.e., non-actuated, condition of the multi-disk clutch B, the cooling fluid O is to be prevented from dwelling in the area of the multi-disk clutch B, in order to reduce drag losses of the multi-disk clutch B. For this purpose, a discharge path for the cooling fluid O is provided, which is illustrated in FIG. 1 by arrows. The cooling fluid O is guided, in the area of the outer disk carrier ALT, in the direction of the end disk ALE and exits the multi-disk clutch B through grooves N formed in the housing GG in the direction of an axially adjacent shaft T, which is connected to a planet carrier PT of the planetary gear set. The grooves N extend in the axial direction starting from the abutting surface AF in the direction of the shaft T.

In FIG. 1, a cutting plane A-A and a cutting plane B-B are indicated. The cutting plane A-A extends through the end disk ALE. The cutting plane B-B extends through the grooves N.

Figure 2:
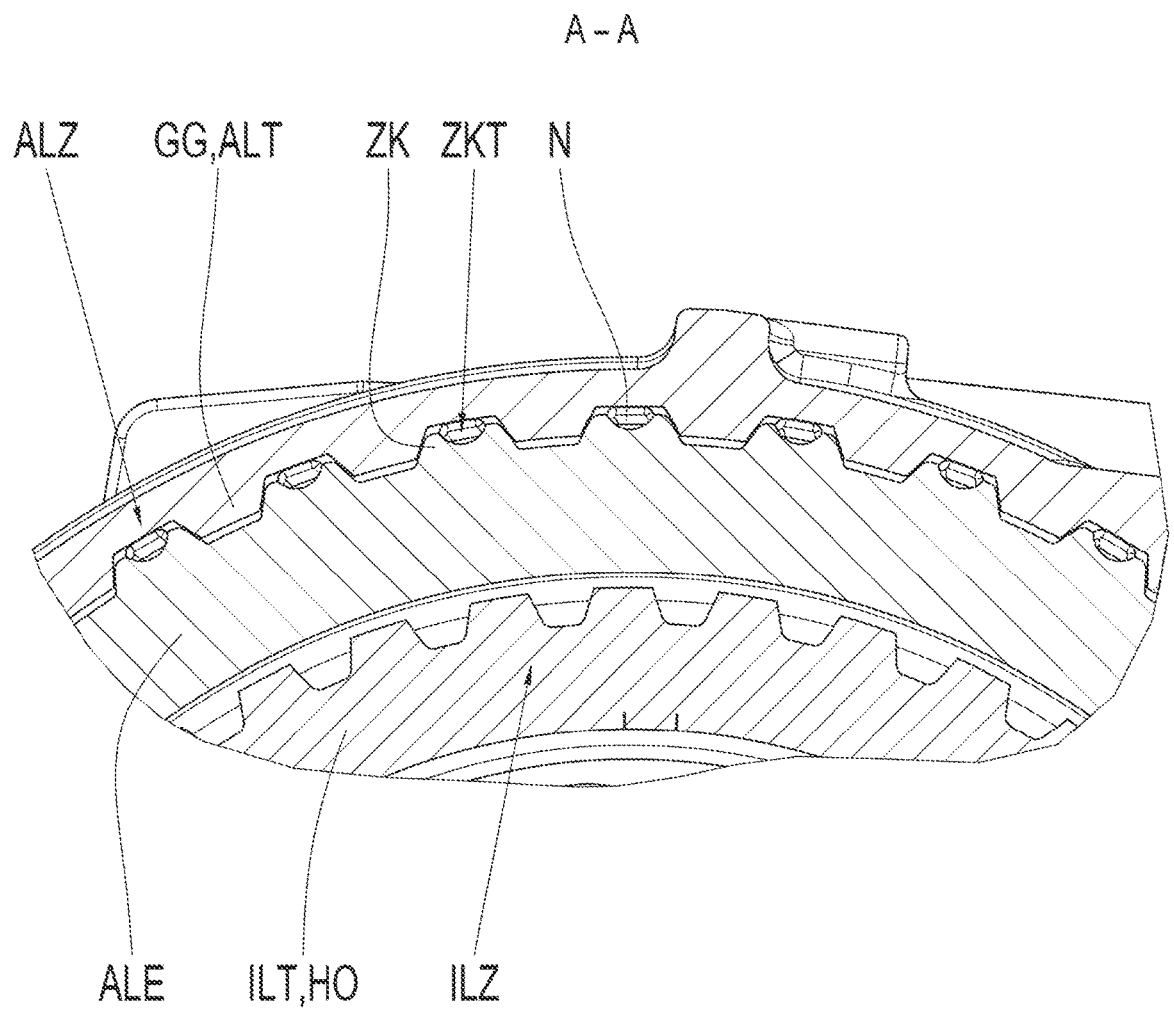
FIG. 2 shows a sectional view of the transmission in the plane A-A according to a first example embodiment.

FIG. 2 shows a sectional view of the transmission G in the plane A-A according to a first example embodiment. In this sectional view, a tooth system ALZ is visible between the housing GG, which forms the outer disk carrier ALT of the multi-disk clutch B, and the end disk ALE. The disk-side teeth of the tooth system ALZ have an indentation ZKT in the area of the tooth tip ZK. Cooling fluid O can flow in the direction of the grooves N through the indentation ZKT. The grooves N are arranged in overlap with the tooth system ALZ, and so one of the grooves N, in each case, is arranged directly behind each of the disk-side teeth.

Figure 3:
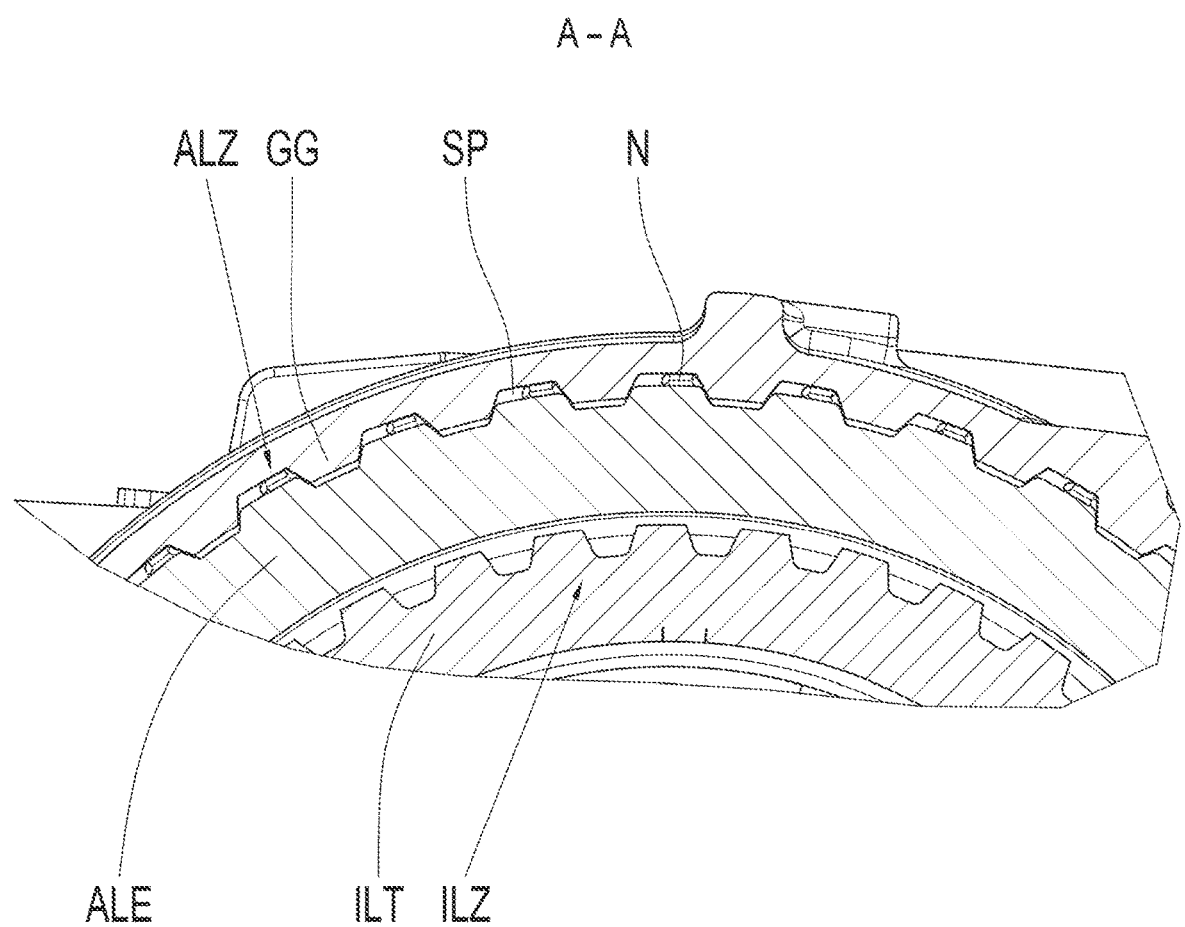
FIG. 3 shows a sectional view of the transmission in the plane A-A according to a second example embodiment.

FIG. 3 shows a sectional view of the transmission G in the plane A-A according to a second example embodiment. In this second example embodiment, the tooth depth of the disk-side teeth of the tooth system ALZ is reduced, and so a gap SP is formed between the disk-side teeth and the housing-side tooth gaps. Cooling fluid O can flow in the direction of the grooves N through the gaps SP. The grooves N are arranged in overlap with the tooth system ALZ, and so one of the grooves N, in each case, is arranged directly behind each of the disk-side teeth.

Figure 4:
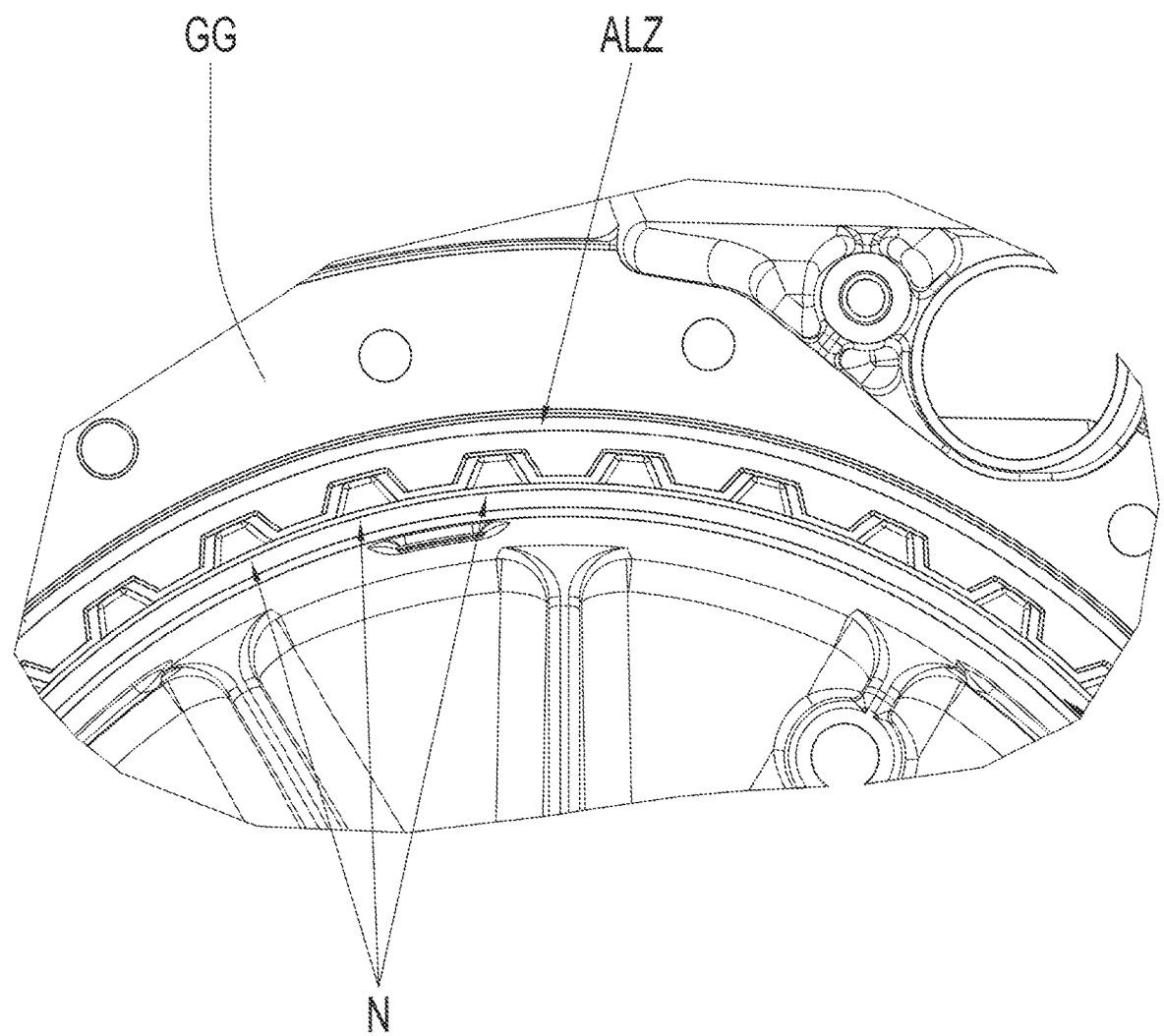
FIG. 4 shows a front view of a housing of the transmission according to a first example embodiment.

FIG. 4 shows a front view of the housing GG according to a first example embodiment. From this view, it is readily apparent that the grooves N are aligned in the center in relation to the tooth system ALZ.

Figure 5:
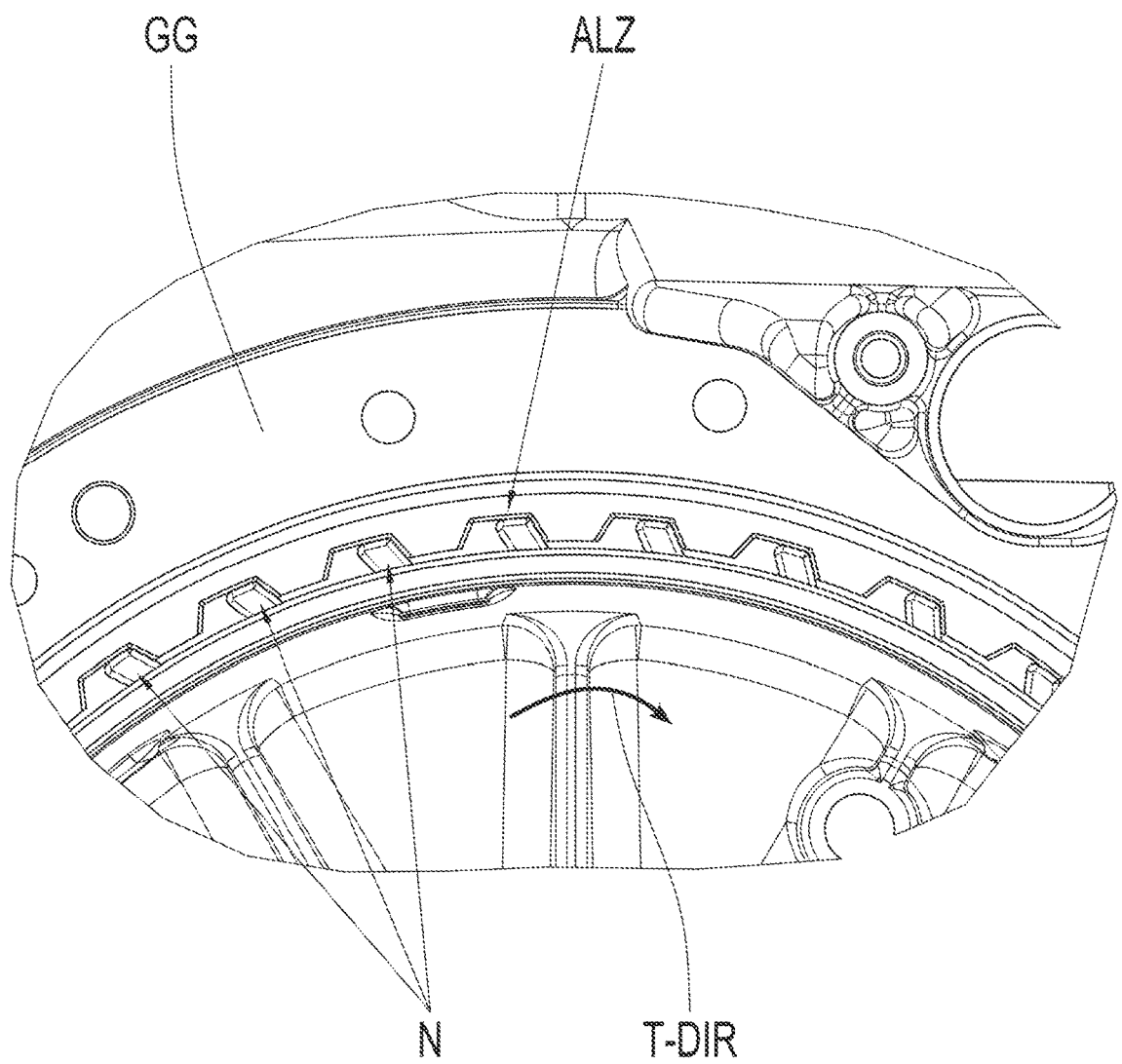
FIG. 5 shows a front view of the housing according to a second example embodiment.

FIG. 5 shows a front view of the housing GG according to a second example embodiment. From this view, it is readily apparent that the grooves N are aligned off-center in relation to the tooth system ALZ, wherein one side edge of the grooves N is aligned at a gear tooth flank of the tooth system ALZ. In addition, the grooves N do not extend in the radial direction, but rather are tilted in the radial direction. The tilting direction corresponds to a preferred direction of rotation T-DIR of the shaft T, which is illustrated in FIG. 5 by an arrow.

Figure 6:
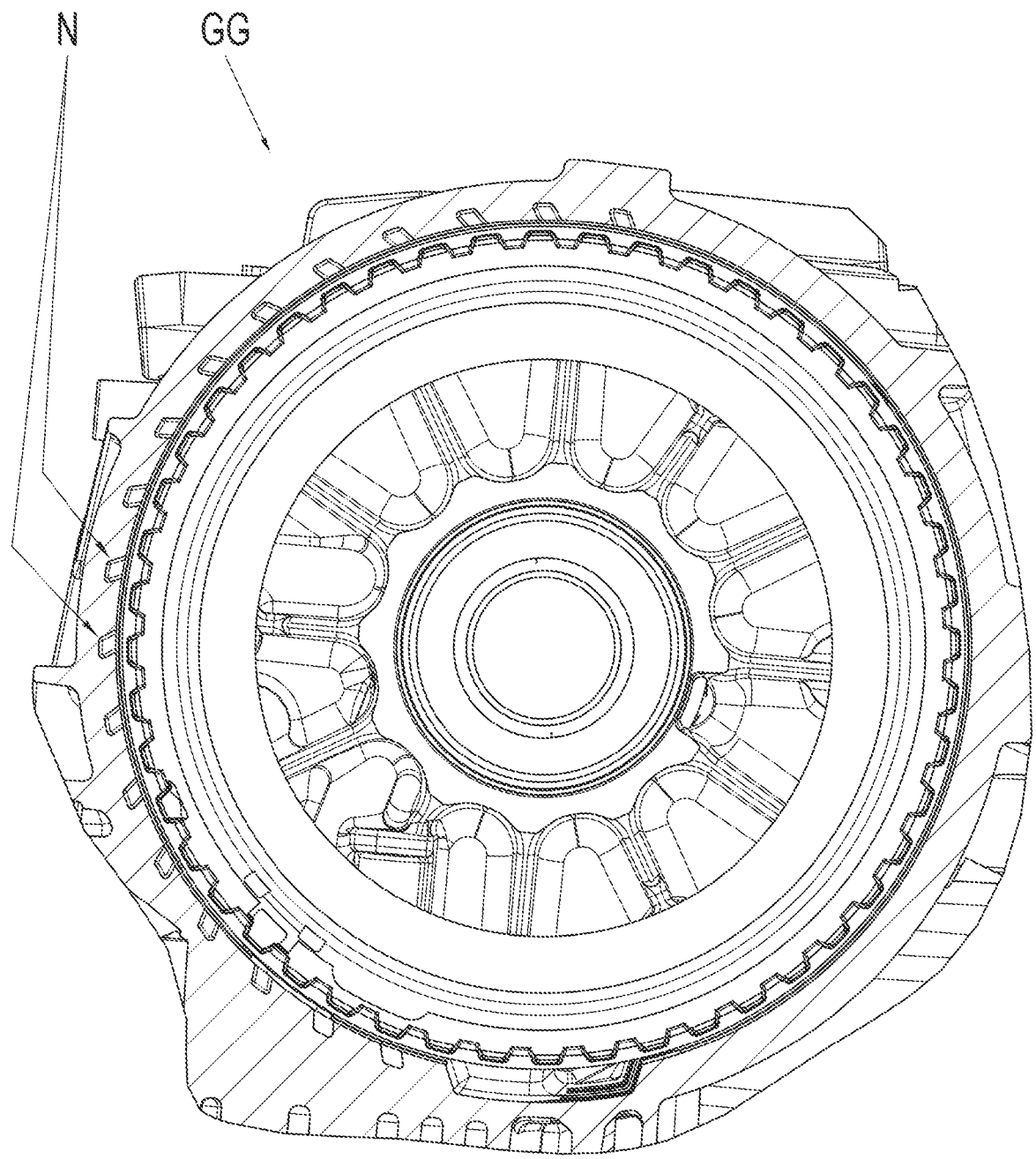
FIG. 6 shows a sectional view of the housing in the plane B-B.

FIG. 6 shows a sectional view of the housing GG in the plane B-B. It is readily apparent therein that the grooves N are not arranged along the entire circumference, but rather only in the "left half" between a spatially lowermost point and a spatially highest point. Of course, the grooves N can also be arranged along the entire circumference in the housing GG.

Figure 7:
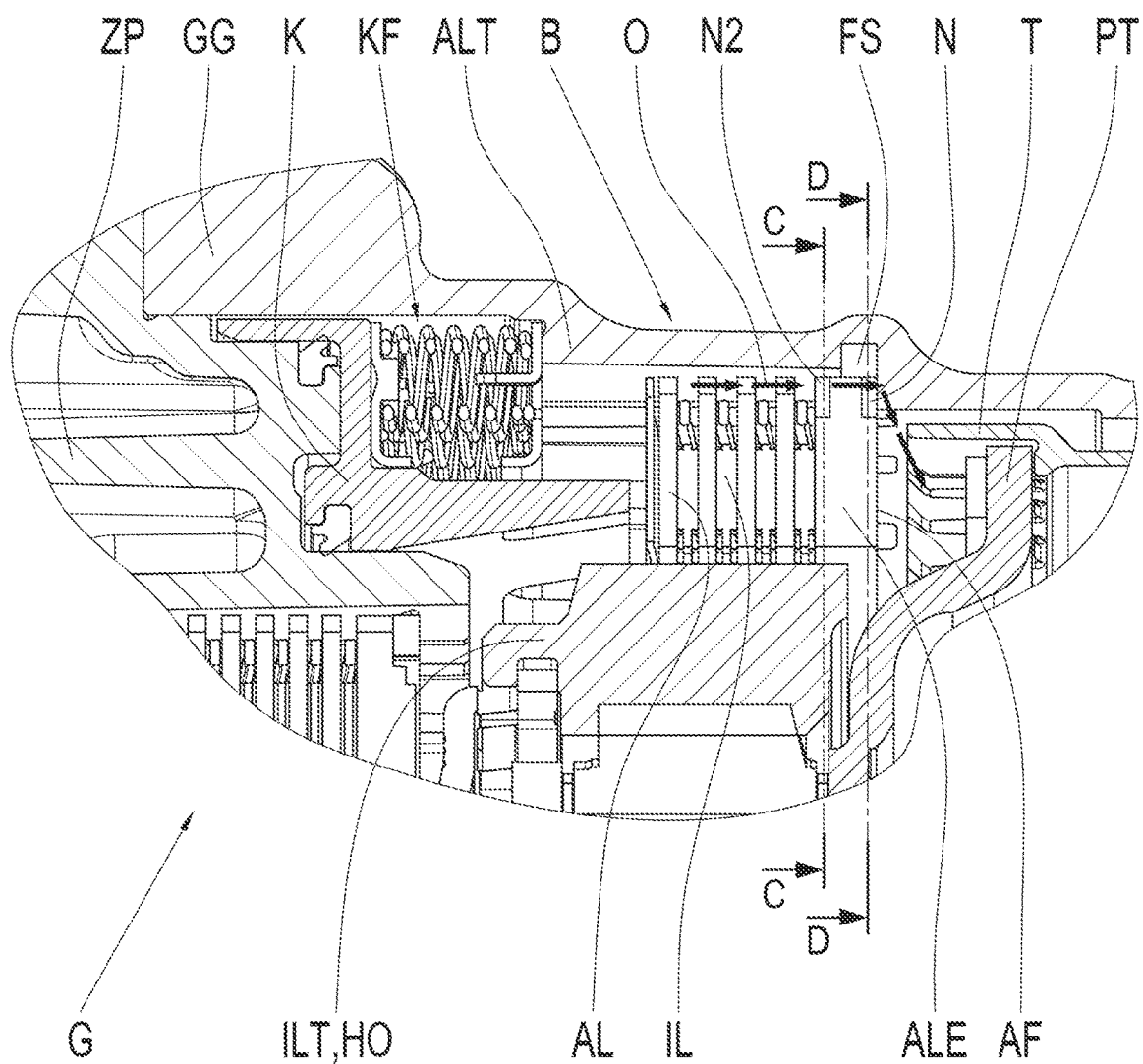
FIG. 7 shows a detailed sectional view of a transmission for a motor vehicle according to a second exemplary embodiment.

FIG. 7 shows a detailed sectional view of a transmission G for a motor vehicle according to a second exemplary embodiment, which essentially corresponds to the first exemplary embodiment represented in FIG. 1, and so reference is made to the comments presented with respect to FIG. 1. In contrast to the first exemplary embodiment, the grooves N are now not formed in the housing GG, but rather in the end disk ALE. The abutting surface AF at the housing GG does not have any grooves. The end disk ALE includes further grooves N2 in addition to the grooves N directed toward the abutting surface AF. The further grooves N2 are formed on the side of the end disk ALE facing away from the abutting surface AF, and are aligned as a mirror image about a center plane of the end disk ALE. As a result, the orientation of the end disk ALE during the installation into the housing GG is not crucial to whether the fluid outflow from the multi-disk clutch B is ensured or not.

In FIG. 7, a cutting plane C-C and a cutting plane D-D are indicated. The cutting plane C-C extends through the end disk ALE in the area of the further grooves N2. The cutting plane D-D extends through the grooves N.

Figure 8:
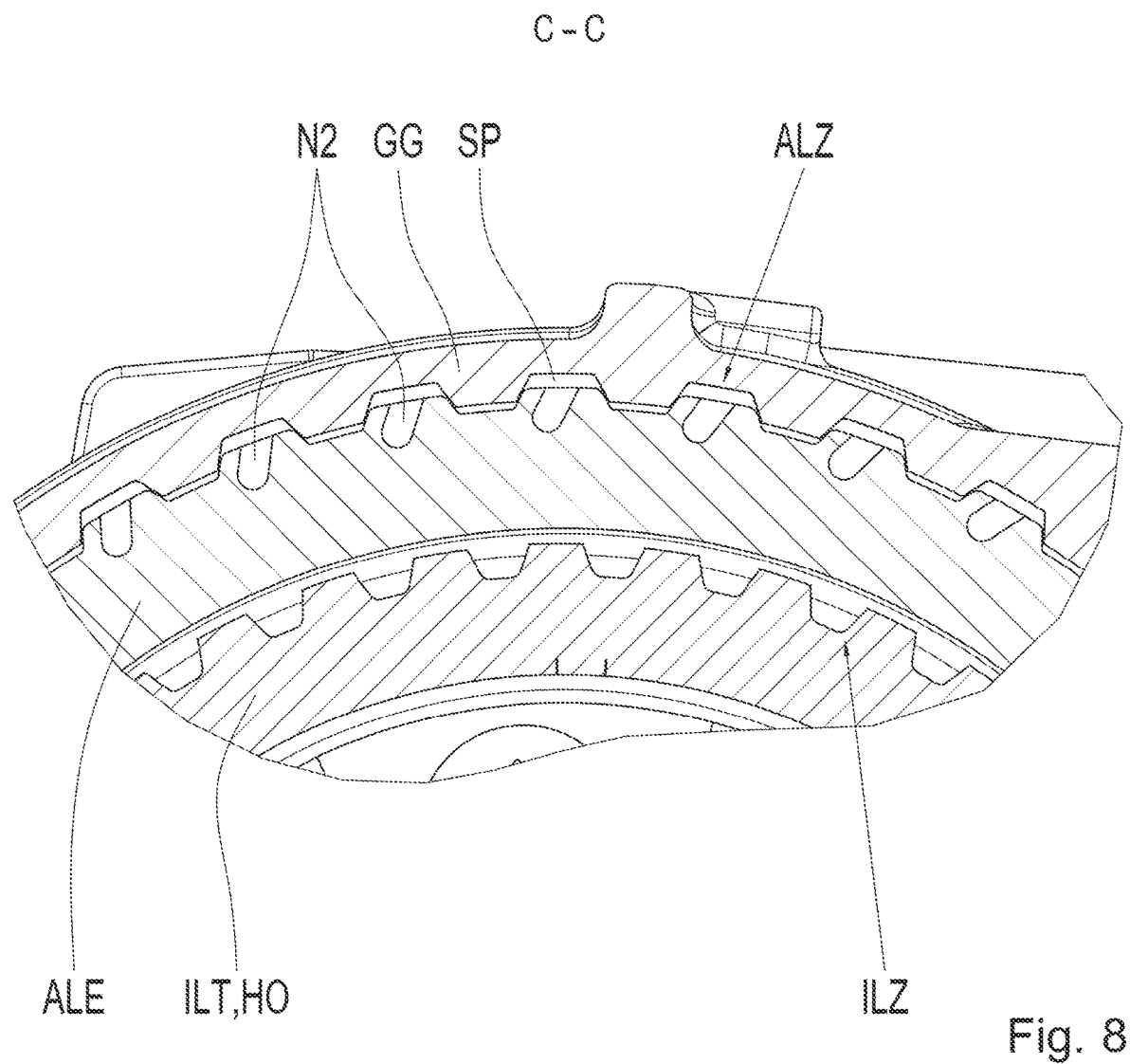
FIG. 8 shows a sectional view of the transmission according to FIG. 7 in the plane C-C.

FIG. 8 shows a sectional view of the transmission G according to FIG. 7 in the plane C-C. Therein, it is readily apparent that the further grooves N2 are arranged in the teeth of the end disk ALE. The further grooves N2 are not aligned along the radial direction, but rather are tilted opposite to the grooves N.

Figure 9:
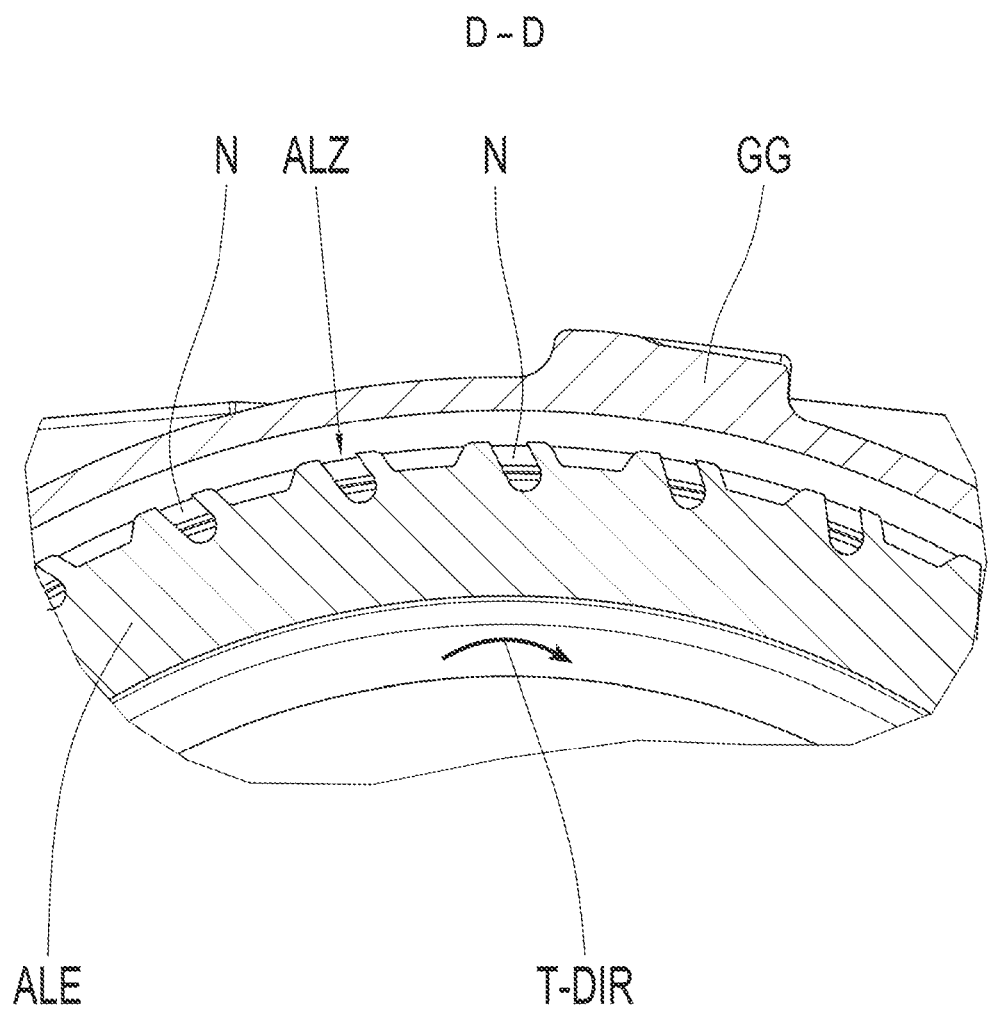
FIG. 9 shows a sectional view of the transmission according to FIG. 7 in the plane D-D.

FIG. 9 shows a sectional view of the transmission G according to FIG. 7 in the plane D-D. The grooves N are also tilted away from the radial direction. The tilting direction corresponds to the preferred direction of rotation T-DIR of the shaft W, which is illustrated in FIG. 9 by an arrow.

Figure 10:
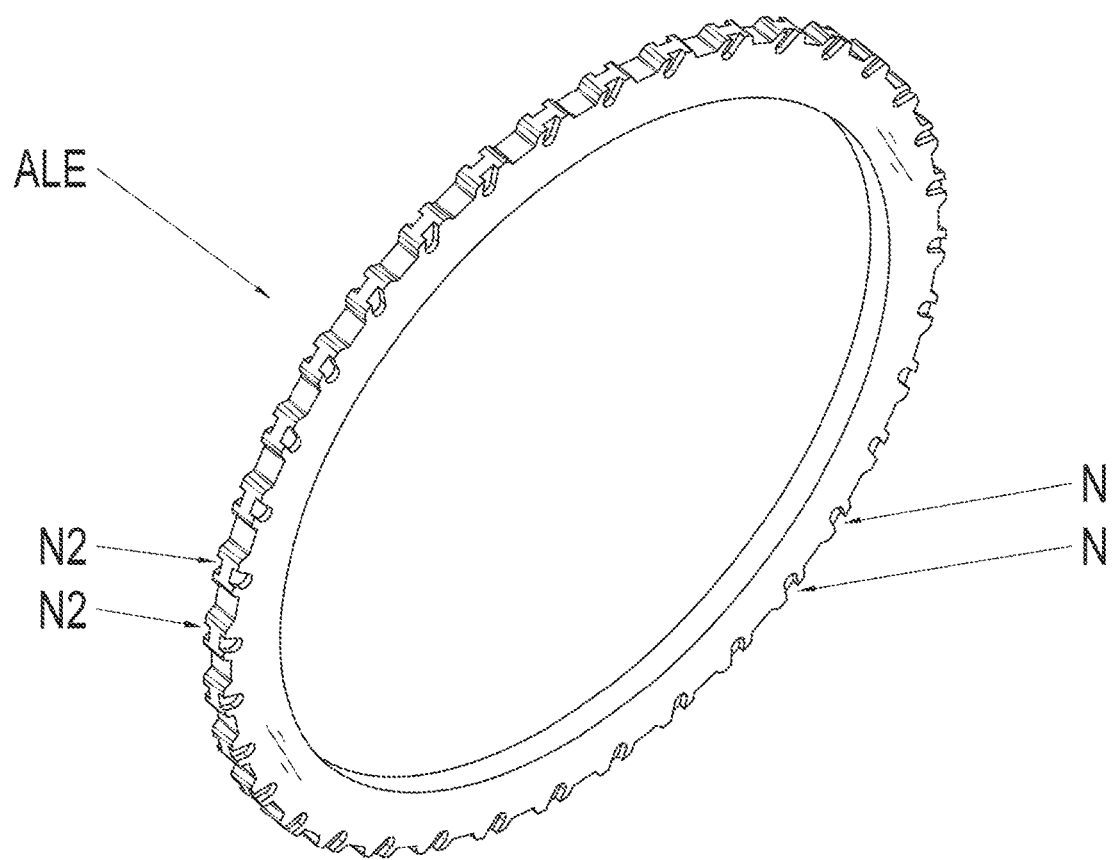
FIG. 10 shows an isometric view of an end disk of the transmission according to FIG. 7.

FIG. 10 shows an isometric view of the end disk ALE according to the exemplary embodiment of the transmission G shown in FIG. 7. Therein, the mirror-image design of the grooves N and of the further grooves N2 at the end surfaces of the end disk ALE is readily apparent.

Due to the design of the grooves N in the housing GG or in the end disk ALE, the outflow of cooling fluid O out of the multi-disk clutch B in the direction of the support side of the multi-disk clutch B is considerably improved. A combination is also conceivable, in which grooves N are provided in the housing GG as well as in the end disk ALE.

As is readily apparent from the sectional views according to FIG. 1 and FIG. 7, a section of the shaft T is arranged axially directly adjacent to the grooves N. Due to the small distance between the housing GG and the shaft T, a Venturi effect can be achieved in the area of the outlet openings of the grooves N. As a result, the cooling fluid is drawn out of the grooves N due to the rotation of the shaft T, as the result of which the drag torque of the multi-disk clutch B can be particularly efficiently reduced.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

G transmission
GG housing
ZP housing plate
B multi-disk clutch
FS relief groove
K piston
KF spring
ALT outer disk carrier
AL, ALE outer clutch disks
ALE end disk
ZK tooth tip
ZKT indentation
ALZ tooth system
SP gap
ILT inner disk carrier
IL inner clutch disks
ILZ tooth system
AF abutting surface
N grooves
N2 further grooves
O cooling fluid
T shaft
HO ring gear
PT planet carrier

The invention claimed is:

1. A wet-running multi-disk clutch (B) for a motor vehicle transmission (G), comprising:
    an inner disk carrier (ILT, HO);
    a plurality of inner clutch disks (IL) connected to the inner disk carrier (ILT, HO) via an inner tooth system (ILZ);
    an outer disk carrier (ALT, GG);
    a plurality of outer clutch disks (AL, ALE) connected to the outer disk carrier (ALT, GG) via an outer tooth system (ALZ), the outer clutch disks (AL) arranged in alternation with the inner clutch disks (IL); and
    a piston (K) provided at a first side of the multi-disk clutch (B), the piston configured to apply a force acting an axial direction onto the inner and outer clutch disks (IL, AL) in order to engage the multi-disk clutch (B),
    wherein the multi-disk clutch (B) is supportable against an abutting surface (AF) of the outer disk carrier (ALT, GG) via an end disk (ALE) of the outer clutch disks (AL) at a second side of the multi-disk clutch (B) that is opposite the first side of the multi-disk clutch (B),
    wherein a plurality of grooves (N) are provided at the abutting surface (AF), the grooves (N) configured and arranged such that cooling fluid (O) routed to the multi-disk clutch (B) is flowable out of the multi-disk clutch (B) through the grooves (N), and
    wherein a teeth-meshing radial height of the outer tooth system (ALZ) between the end disk (ALE) and the outer disk carrier (ALT, GG) is less than a tooth-meshing radial height of the outer tooth system (ALZ) of the other outer clutch disks (AL) such that a radial gap (SP) is formed between each tooth of the end disk (ALE) and the outer disk carrier (ALT, GG), the cooling fluid (O) flowable along the axial direction through the gaps (SP) to the grooves (N).

2. The wet-running multi-disk clutch (B) of claim 1, wherein:
    the grooves (N) are arranged such that the grooves (N) overlap with the outer tooth system (ALZ) between the end disk (ALE) and the outer disk carrier (ALT, GG); and
    the cooling fluid (O) proximate the outer tooth system (ALZ) is flowable directly into the grooves (N).

3. The wet-running multi-disk clutch (B) of claim 2, wherein each of the grooves (N) is aligned with a center of a respective tooth of the outer tooth system (ALZ) along the axial direction.

4. The wet-running multi-disk clutch (B) of claim 1, wherein one or more teeth of the outer tooth system (ALZ) between the end disk (ALE) and the outer disk carrier (ALT, GG) has an indentation (ZKT) proximate a tooth tip (ZK) of the one or more teeth of the outer tooth system (ALZ), the cooling fluid (O) flowable along the axial direction through the indentation (ZKT) to the grooves (N).

5. The wet-running multi-disk clutch (B) of claim 1, wherein the multi-disk clutch (B) is a brake, and the outer disk carrier (ALT, GG) is a rotationally fixed outer disk carrier (ALT, GG).

6. The wet-running multi-disk clutch (B) of claim 1, wherein a respective one of the grooves (N) is associated with each tooth of the outer tooth system (ALZ) between the end disk (ALE) and the outer disk carrier (ALT, GG).

7. The wet-running multi-disk clutch (B) of claim 6, wherein the grooves (N) are arranged only at a portion of a perimeter of the multi-disk clutch (B), and the grooves (N) are not arranged on the remainder of the perimeter of the multi-disk clutch (B).

8. The wet-running multi-disk clutch (B) of claim 7, wherein the portion of the perimeter extends between a lowest point and a highest point of the multi-disk clutch (B).

9. A wet-running multi-disk clutch (B) for a motor vehicle transmission (G), comprising:
    an inner disk carrier (ILT, HO);
    a plurality of inner clutch disks (IL) connected to the inner disk carrier (ILT, HO) via an inner tooth system (ILZ);
    an outer disk carrier (ALT, GG);
    a plurality of outer clutch disks (AL, ALE) connected to the outer disk carrier (ALT, GG) via an outer tooth system (ALZ), the outer clutch disks (AL) arranged in alternation with the inner clutch disks (IL); and
    a piston (K) provided at a first side of the multi-disk clutch (B), the piston configured to apply a force acting an axial direction onto the inner and outer clutch disks (IL, AL) in order to engage the multi-disk clutch (B),
    wherein the multi-disk clutch (B) is supportable against an abutting surface (AF) via an end disk (ALE) of the outer clutch disks (AL) at a second side of the multi-disk clutch (B) that is opposite the first side of the multi-disk clutch (B),
    wherein a plurality of grooves (N) are provided at one or both of the abutting surface (AF) and the end disk (ALE), the grooves (N) configured and arranged such that cooling fluid (O) routed to the multi-disk clutch (B) is flowable out of the multi-disk clutch (B) through the grooves (N),
    wherein the grooves (N) are arranged such that the grooves (N) overlap with the outer tooth system (ALZ) between the end disk (ALE) and the outer disk carrier (ALT, GG),
    wherein the cooling fluid (O) proximate the outer tooth system (ALZ) is flowable directly into the grooves (N), and
    wherein each of the grooves (N) is circumferentially offset from a center of a respective tooth of the outer tooth system (ALZ).

10. The wet-running multi-disk clutch (B) of claim 9, wherein an edge of each of the grooves (N) is aligned with a gear tooth flank of a respective tooth of the outer tooth system (ALZ) along the axial direction.

11. A wet-running multi-disk clutch (B) for a motor vehicle transmission (G), comprising:
- an inner disk carrier (ILT, HO);
- a plurality of inner clutch disks (IL) connected to the inner disk carrier (ILT, HO) via an inner tooth system (ILZ);
- an outer disk carrier (ALT, GG);
- a plurality of outer clutch disks (AL, ALE) connected to the outer disk carrier (ALT, GG) via an outer tooth system (ALZ), the outer clutch disks (AL) arranged in alternation with the inner clutch disks (IL); and
- a piston (K) provided at a first side of the multi-disk clutch (B), the piston configured to apply a force acting an axial direction onto the inner and outer clutch disks (IL, AL) in order to engage the multi-disk clutch (B),
- wherein the multi-disk clutch (B) is supportable against an abutting surface (AF) via an end disk (ALE) of the outer clutch disks (AL) at a second side of the multi-disk clutch (B) that is opposite the first side of the multi-disk clutch (B),
- wherein a plurality of grooves (N) are provided at one or both of the abutting surface (AF) and the end disk (ALE), the grooves (N) configured and arranged such that cooling fluid (O) routed to the multi-disk clutch (B) is flowable out of the multi-disk clutch (B) through the grooves (N), and
- wherein the grooves (N) are angled relative to a radial direction of the multi-disk clutch (B).

12. A transmission (G) for a motor vehicle, comprising a wet-running multi-disk clutch (B) that comprises an inner disk carrier (ILT, HO), a plurality of inner clutch disks (IL) connected to the inner disk carrier (ILT, HO) via an inner tooth system (ILZ), an outer disk carrier (ALT, GG), a plurality of outer clutch disks (AL, ALE) connected to the outer disk carrier (ALT, GG) via an outer tooth system (ALZ), and a piston (K) provided at a first side of the multi-disk clutch (B), wherein
- the outer clutch disks (AL) arranged in alternation with the inner clutch disks (IL), and the piston is configured to apply a force acting an axial direction onto the inner and outer clutch disks (IL, AL) in order to engage the multi-disk clutch (B),
- the multi-disk clutch (B) is supportable against an abutting surface (AF) of the outer disk carrier (ALT, GG) via an end disk (ALE) of the outer clutch disks (AL) at a second side of the multi-disk clutch (B) that is opposite the first side of the multi-disk clutch (B), and
- a plurality of grooves (N) are provided at the abutting surface (AF), the grooves (N) configured and arranged such that cooling fluid (O) routed to the multi-disk clutch (B) is flowable out of the multi-disk clutch (B) through the grooves (N); and
- a rotary shaft (T) arranged proximate the grooves (N) such that a suction of cooling fluid (O) emerging from the grooves (N) is generatable due to rotation of the rotary shaft (T), wherein each of the grooves (N) is circumferentially offset from a center of a respective tooth of the outer tooth system (ALZ) in a manner corresponding to a preferred direction of rotation of the shaft (T).

13. The transmission (G) of claim 12, wherein the multi-disk clutch (B) is a brake, and the outer disk carrier (ALT, GG) is a rotationally fixed outer disk carrier (ALT, GG).

14. The transmission (G) of claim 13, further comprising a housing (GG), the outer disk carrier (ALT) formed by the housing (GG), the grooves (N) formed in the housing (GG).

* * * * *